May 20, 1969     A. S. MADDEN     3,444,888
RELIEF VALVES
Filed Nov. 21, 1966
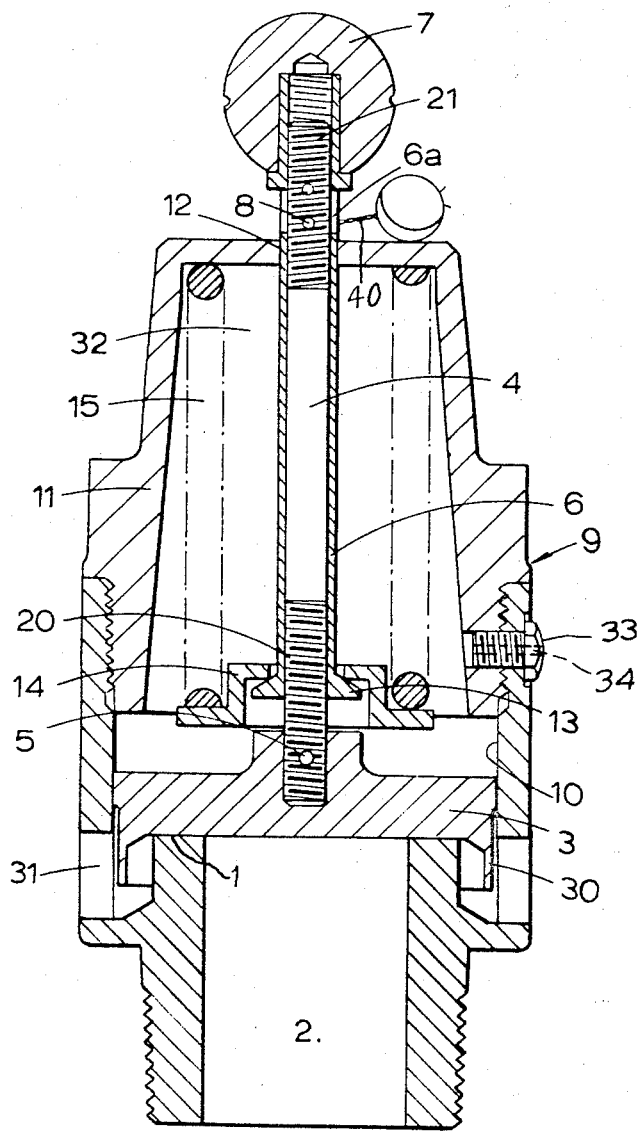
INVENTOR
ANDREW SIDNEY MADDEN
BY
ATTORNEYS

United States Patent Office 3,444,888
Patented May 20, 1969

3,444,888
RELIEF VALVES
Andrew Sidney Madden, Bristol, England, assignor to Seetru Limited, Bristol, England, a British company
Filed Nov. 21, 1966, Ser. No. 595,689
Int. Cl. F16k 15/06, 17/06
U.S. Cl. 137—542                                    8 Claims

ABSTRACT OF THE DISCLOSURE

The relief valve comprises an annular valve seat surrounding an inlet port. The seat is integral with an upward extending housing which has an opening in its upper end. The housing encloses the closure member resting on the seat. A sleeve enclosed stem is secured to the closure and both stem and sleeve extend slidably through the opening in the housing. The lower end of the sleeve carries an abutment for a compression spring which has its upper end abutting the upper end wall of the housing.

---

This invention relates to relief valves, safety valves and by-pass valves for use in fluid pressure systems and of a general type wherein the valve closure member is held in a closed position on a valve seat by spring means and arranged in such a way that when the fluid pressure from a high pressure region acting through a port in the seat, on the valve closure member reaches a given level, the force exerted by the spring is overcome and the closure member lifts from the seat so as to allow fluid flow through the port. Relief valves of this general type are arranged to discharge to a low pressure region. For example, discharge may be directly to atmosphere through holes in the valve body surrounding the valve closure member or they can be provided with piped connections which permit discharge into an outlet line leading to a low pressure region when the valve is open.

In spring loaded relief valves for air and gases it is a well estabilshed practice to provide a means of varying the compression of the spring and thereby the pressure setting of the valve. It is frequently difficult to find a technically and economically satisfactory method of providing this spring adjustment while at the same time providing for a valve lifting device and a convenient method of locking the spring adjustment as well.

The purpose of the present invention is to provide a means of adjusting the spring pressure while at the same time incorporating a valve lifting knob in the valve as well as a ready facility for applying a wire lock and lead seal once the preselected setting has been achieved.

According to this invention a relief valve is provided which includes a closure member guided in the valve housing, the closure member being carried on a stem which passes through a valve housing and protrudes through the valve cap to accommodate a lifting knob at its exposed end. Spring means transmit pressure to the head of the closure member, loading it against an annular valve seat so as to resist a preselected level of fluid pressure which the valve is intended to relieve and control. The spring means are advantageously constituted by a coil spring which abuts at one end against a cap constituting part of a composite housing for the valve while the other end of the coil spring, which applies load to the valve closure member, preferably rests on a washer or carrier plate which presses against an abutment on the valve stem assembly which is described below. The carrier plate may be a parallel sliding fit relative to the stem assembly, or the abutment for the carrier plate may be arranged to have a conical or spherical centering and self-aligning action to take up any variation and mal-alignment in the relief valve spring.

It is an essential part of the present invention that the valve stem assembly includes a sleeve arranged about the stem and that abutment which supports the spring carrier plate is integral with the said sleeve which latter can be raised or lowered relative to the stem by screw adjustment. The sleeve protrudes through the valve cap and the bore of the valve cap provides a guide for the sleeve and thereby the valve closure member and stem assembly as a whole.

One embodiment of the invention is shown by way of example in transverse cross-section in the accompanying drawing.

Referring now to the drawing, 1 represents an annular valve seat surrounding an inlet pot 2. Arranged to abut with seat 1 is a closure member 3. The closure member 3 is carried on a generally cylindrical threaded stem 4, threaded into the closure member and locked by a pin 5. A cylindrical sleeve 6 is arranged on the stem 4. The lower end of the sleeve 6 is threaded and is in threaded engagement with the threaded lower end portion 20 of the stem 4. The upper part of the sleeve 6 is not threaded. However, the upper part of the stem 4 is threaded and is engaged by a knob 7. The upper part of sleeve 6 in region 6a is provided with castellations and may be provided additionally with spanner flats. The stem 4 is provided with apertures 8, through which locking means such as a pin or wire may be passed to cooperate with the castellations in the region 6a of the sleeve 6.

The sleeve 6 and the closure member 3 are guided for longitudinal sliding movement in the directions towards and away from the annular seat 1 within a housing generally designated 9 of the valve. In this embodiment, the closure member 3 is constituted as a piston sliding in a generally cylindrical bore portion 10 of the housing, while 11 is a cap for the housing through an aperture 12 in the upper part of which the sleeve 6 is a sliding fit.

At its lower end adjacent the closure member 3 the sleeve is provided with an outwardly flared abutment shoulder 13. Surrounding the sleeve is an annular washer 14 which bears on the abutment shoulder 13. A coil spring 15 is compressed between the washer 14 and the cap 11 of the composite housing 9.

From the arrangement illustrated it will be seen that if the sleeve 6 is rotated relative to the stem 4, this will be effective to alter the axial position of the sleeve relative to the stem. This in turn will be effective to vary the pressure of exerted by the spring 15 on the valve closure member 3 to urge it into engagement with the annular seat 1 surrounding port 2.

In order to allow for a right handed turn for increased pressure setting, it is convenient to make the lower threaded end portion 20 on the stem 4 and the corresponding thread of the sleeve 6 as a left-handed thread, while the upper thread 21 of the stem 4 is a right-handed thread. Thus a clockwise rotation of the sleeve relative to the stem 4 will raise the washer 14 relative to the closure member 3 and thereby compress the spring 15 and increase the spring loading on the closure member 3. The stem 4 is made long enough to protrude from the sleeve 6 even at the maximum pressure setting. The lifting knob 7 is screwed home on the stem 4 so as to abut against the end of the adjusting sleeve 6 thereby producing a neat and clean appearance without any gaps which might collect any oil or dirt.

In order to vary the valve adjustment it is necessary to screw back the knob 7 slightly, apply gentle hand pressure to the knob so as to load the closure member 3 against the annular seat 1, to prevent rotation of the closure member; and then turn the adjusting sleeve 6 by means of a spanner or a key either clockwise or anti-clockwise according to whether the valve setting is to be decreased or increased. Subsequently the lifting knob is screwed home again to abut against the end of the adjusting sleeve 6.

If lead sealing is desired this is achieved by threading a wire 40 through a hole 8 in the stem 4 to cooperate with an appropriately positioned castellation of the sleeve 6.

It will be noted that the closure member 3 is provided with a flared skirt 30 so that when the closure member 3 lifts off the seat 1, fluid issuing from port 2 is forced to pass around the skirt 30. This causes substantial alteration in the direction of the fluid flow and generates dynamic lift forces on the closure member 3 which tend to cause it to adopt very rapidly a fully open position as soon as the pressure in the port 2 exceeds the pressure exerted by the spring 15 in the closure direction.

When the closure member 3 is lifted off the seat 1, some of the pressure fluid flowing to region 31 which constitutes an outlet from the relief valve, will pass past the piston-like closure member 3 and into the closed chamber defined by the housing 9. This closed chamber is numbered 32 and it will be appreciated that the instantaneous pressure in the chamber 32, when the valve is opened, will be higher than the pressure outside the housing 9. This slightly elevated pressure in the chamber 32 supplements the force exerted by the spring 15 tending to close the valve.

Due to this additional force derived from the pressure in the chamber 32, as soon as the pressure in the region of port 2 drops below the pressure derived from spring 15 and tending to cause the closure member 3 to abut with the seat 1, the closure member 3 will be moved sharply in the downward direction and no hammering will occur. Also because of the excess pressure in the chamber 32 closure of the valve will occur sharply very close below the nominal set pressure as determined by adjustment of the sleeve 6. The level of pressure achieved in the auxiliary chamber 32 is determined by a number of factors and in particular the leakage between the sleeve 6 and aperture 8 in the valve cap 11. However, if additional leakage is required in order that an excess of pressure is not achieved in the chamber 32, a controlled leakage path is provided by screw 33 which has a bore 34 of preselected size chosen to suit the particular requirement.

By the present invention improved relief valves are obtained.

I claim:

1. A relief valve including a cylindrical stem having fixed to it a closure member arranged to abut with an annular seat to obdurate a valve port surrounded by said seat, a cylindrical sleeve arranged on said stem in threaded engagement therewith, said sleeve and said closure member being guided for longitudinal sliding movement within a housing of the valve in the directions towards and away from the seat, spring means arranged to urge said sleeve in a longitudinal direction such as to urge the closure member into abutment with the seat, and rotation of the sleeve relative to the stem being effective to alter the position of the sleeve axially relative to the stem and hence to vary the spring pressure urging the closure member towards the seat, both said stem and said sleeve thereon projecting externally of the housing of the valve so as to be accessible for adjustment the one relative to the other.

2. A relief valve according to claim 1, wherein the end of the sleeve which is outside the housing is castellated and wherein the stem has a transverse aperture through which locking means may be passed to cooperate with the castellations of the sleeve.

3. A relief valve according to claim 1, wherein the end of the sleeve which is outside the housing has spanner flats.

4. A relief valve according to claim 1, including a knob threaded on the part of the stem which projects externally of the housing, said knob being capable of being screwed on said stem so far as to abut with the end of the sleeve.

5. A relief valve including a cylindrical stem having fixed to it a closure member arranged to abut with an annular seat to obdurate a valve port surrounded by said seat, a cylindrical sleeve arranged on said stem in threaded engagement therewith, said sleeve and said closure member being guided for longitudinal sliding movement within a housing of the valve in the directions towards and away from the seat, spring means arranged to urge said sleeve in a longitudinal direction such as to urge the closure member into abutment with the seat, and rotation of the sleeve relative to the stem being effective to alter the position of the sleeve axially relative to the stem and hence to vary the spring pressure urging the closure member towards the seat, said closure member being guided for longitudinal movement in the directions towards and away from said seat by being constituted with a circular periphery which slides axially in a cylindrical bore of the housing, said closure member being further guided for longitudinal movement in the directions toward and away from said seat by said sleeve, which surrounds the stem fixed to the closure member, being a sliding fit in a hole in the wall of said valve housing.

6. A relief valve according to claim 5, wherein the closure member is constituted as a piston sliding in said cylindrical bore and wherein the housing encloses a chamber, the closure member being disposed between the chamber and the valve seat.

7. A relief valve according to claim 6, wherein the stem, together with the sleeve thereon project through said chamber, said sleeve having at its end adjacent the closure member an outwardly flared abutment shoulder, and including an annular washer surrounding said sleeve and bearing on the abutment shoulder, and said spring means comprising a coil spring arranged about said sleeve and compressed between the washer and the valve housing.

8. A relief valve according to claim 1 wherein said sleeve and said stem are in threaded engagement with one another by means of a left-handed thread whereby a right-handed turn on said sleeve relative to said stem is effective to increase the distance between said sleeve and said closure member.

References Cited

UNITED STATES PATENTS

| 1,682,848 | 9/1928 | Moody et al. | 137—542 X |
| 2,264,656 | 12/1941 | Briscoe et al. | 137—542 X |
| 2,353,306 | 7/1944 | Henry | 137—542 |
| 2,672,882 | 3/1954 | Bergquist | 137—542 X |
| 3,008,485 | 11/1961 | Johnson et al. | 137—542 X |

FOREIGN PATENTS 292,595   1/1932   Italy.

STANLEY N. GILREATH, Primary Examiner.

U.S. Cl. X.R.

251—176, 336